Feb. 28, 1933.　　I. W. ROBERTSON　　1,899,293
VIBRATION INSULATOR
Filed Aug. 22, 1930　　2 Sheets-Sheet 1
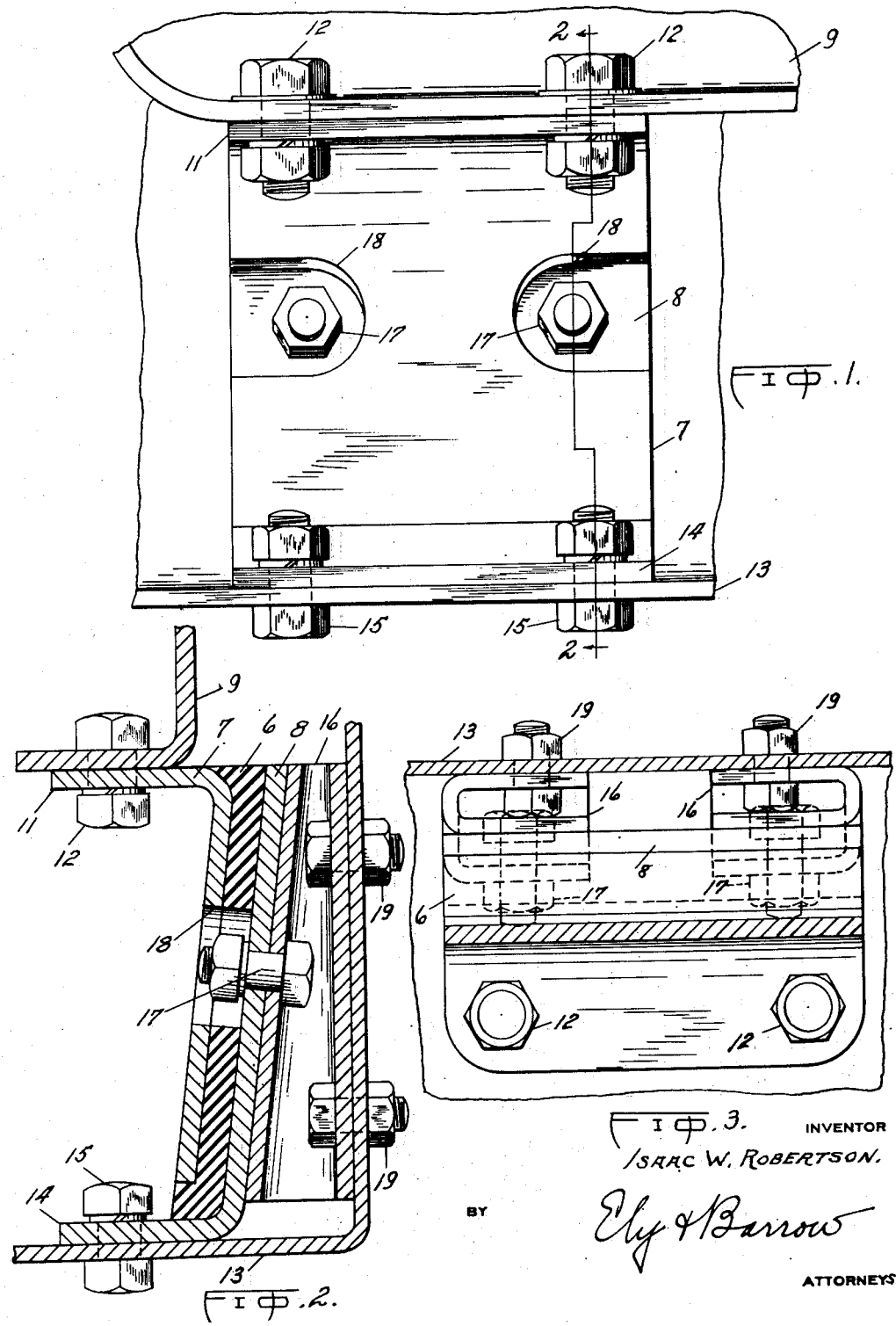

Feb. 28, 1933.  I. W. ROBERTSON  1,899,293
VIBRATION INSULATOR
Filed Aug. 22, 1930   2 Sheets-Sheet 2

INVENTOR
ISAAC W. ROBERTSON.
BY Ely + Barrow
ATTORNEYS.

Patented Feb. 28, 1933

1,899,293

UNITED STATES PATENT OFFICE

ISAAC W. ROBERTSON, OF AKRON, OHIO, ASSIGNOR TO THE FIRESTONE TIRE & RUBBER COMPANY, OF AKRON, OHIO, A CORPORATION OF OHIO

VIBRATION INSULATOR

Application filed August 22, 1930. Serial No. 477,013.

This invention relates to vibration or shock insulators of a type which are particularly adapted for motor support use in automobiles.

The general object of the invention resides in the provision of an inexpensive, efficient vibration insulator which is readily adaptable to a plurality of uses, particularly in the transporting vehicle art.

The above and other objects of the invention are achieved by the device illustrated in the accompanying drawings and described below, it being understood that the invention is not limited to the exact details shown and described.

In the drawings:

Figure 1 is a side elevation of an insulator embodying the invention.

Figure 2 is a vertical section taken on line 2—2 of Figure 1.

Figure 3 is a plan view of Figure 1.

Figure 4:
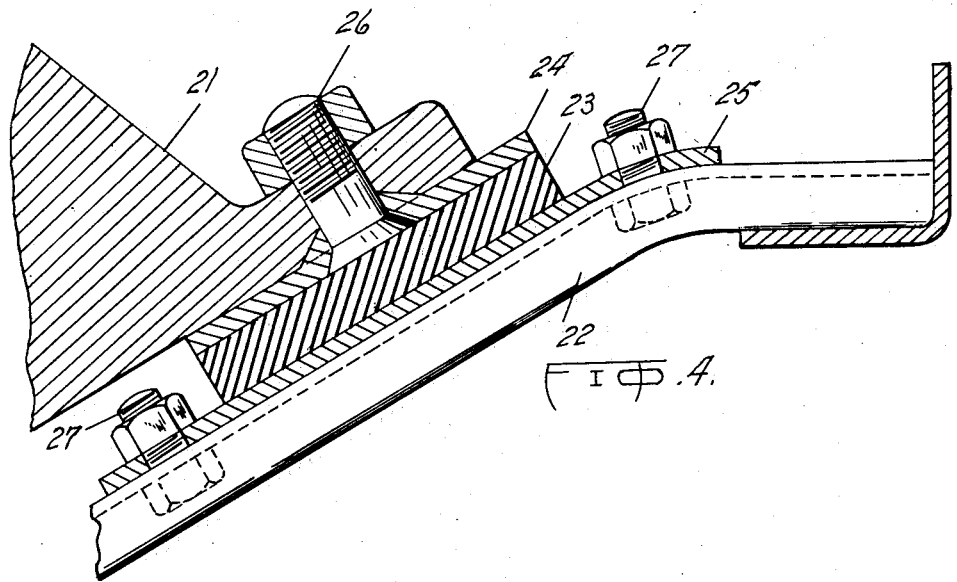
Figure 4 is a view looking at the top side of a modified form of the invention.

Referring to the drawings the insulator embodying the invention comprises a rubber pad 6 vulcanized to and between a top plate 7 and a bottom plate 8. The top plate 7 is secured to a bracket 9 on one of the members to be insulated (not shown) and for this purpose the top plate 7 may be formed with an integral flange 11 which may be bolted as at 12 to the bracket 9. In a like manner the bottom plate 8 is secured to an angle iron 13 fixed to the other of the members to be insulated (not shown). To this end the bottom plate 8 may be formed with an integral flange 14 which is secured as at 15 to the angle iron 13.

It will be seen from a study of Figure 2 that the top plate 7 and bottom plate 8 are not vertical to the flanges 11 and 14 but that they form an angle somewhat less than ninety degrees therewith so that in relative vertical movement of the plates together the rubber pad 6 will be subjected to a compressive wedgelike action.

In order to strengthen the back of the bottom plate 8, a filler plate 16, which may be in the form of a pair of plates, is preferably provided between the back of the bottom plate and the upright portion of the angle iron 13. The back plate 8 is secured to the filler plates by suitable means, such as bolts 17, the top plate 7 and rubber pad 6 being cut away as at 18 for the reception thereof. Bolts 19 secure the fillers to the angle 13.

Figure 5:
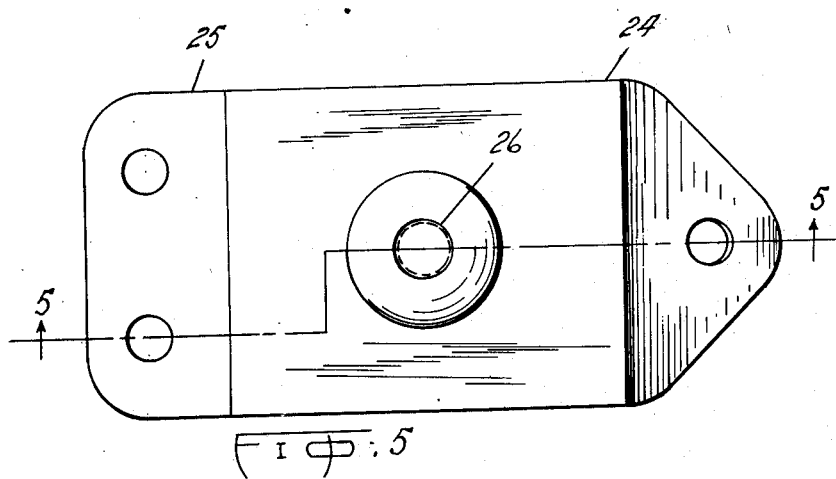
Figure 5 is a vertical sectional view on line 5—5 of Figure 4 illustrating the manner in which the insulator is mounted.

In the modified form of the invention illustrated in Figures 4 and 5, the numeral 21 indicates one of the two members to be insulated such as a motor, and the numeral 22 indicates the other of the members to be insulated such as the frame for the motor. The insulator itself comprises a rubber pad 23 vulcanized to and between a top plate 24 and a bottom plate 25. The top plate 24 is secured to the member 21 and for this purpose a flat head bolt 26 may be used which is centrally secured to the plate 24. In order to secure the plate 25 to the frame 22 the ends of the plate may be extended and fastened by bolts 27.

The arrangement of the frame 22 and motor 21 is such that the insulator is mounted at an angle to the horizontal so that relative movement of the top and bottom plates will subject the rubber pad 23 to wedge-like compressive action.

As many changes could be made in the construction other than those herein described, particularly with respect to the angle the insulator makes with the horizontal and with the line of thrust, it is intended that all matter herein described or illustrated shall be interpreted as illustrative only and not in a limiting sense. Accordingly various modifications and applications of the invention can be resorted to without departing from the spirit of the invention or the scope of the appended claims.

What is claimed is:

1. A vibration insulator comprising top and bottom plates, a rubber pad vulcanized to and between said top and bottom plates, a horizontal attaching flange on the top of said top plate, a horizontal attaching flange on the bottom of said bottom plate, said flanges making angles with the top and bottom plates, and a filler plate secured to the back of said bottom plate and giving it a vertical clamping surface.

2. A vibration insulator comprising top and bottom plates, a rubber pad vulcanized to and between said top and bottom plates, a horizontal attaching flange on the top of said top plate, and a horizontal attaching flange on the bottom of said bottom plate, said flanges making angles with the top and bottom plates.

3. A vibration insulator comprising top and bottom plates adapted to be mounted at an angle to the vertical and horizontal, a rubber pad vulcanized to and between said top and bottom plates, a horizontal attaching flange on one of said plates, said flange extending at an angle to the plate on which it is formed.

ISAAC W. ROBERTSON.